United States Patent
St. Romain et al.

(10) Patent No.: US 11,506,503 B2
(45) Date of Patent: Nov. 22, 2022

(54) PRIORITIZING UPLOADING OF MAP RELATED DATA FROM VEHICLES

(71) Applicant: TOYOTA RESEARCH INSTITUTE, INC., Los Altos, CA (US)

(72) Inventors: Randall J. St. Romain, Ann Arbor, MI (US); Schuyler H. Cohen, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 145 days.

(21) Appl. No.: 16/924,494

(22) Filed: Jul. 9, 2020

(65) Prior Publication Data

US 2022/0011120 A1  Jan. 13, 2022

(51) Int. Cl.
  *G01C 21/32* (2006.01)
  *G01C 21/34* (2006.01)
  *G08G 1/0968* (2006.01)
  *G08G 1/00* (2006.01)
  *G08G 1/01* (2006.01)

(52) U.S. Cl.
  CPC ......... *G01C 21/32* (2013.01); *G01C 21/3492* (2013.01); *G08G 1/0104* (2013.01); *G08G 1/096827* (2013.01); *G08G 1/096844* (2013.01); *G08G 1/20* (2013.01)

(58) Field of Classification Search
  CPC .. G01C 21/32; G01C 21/3492; G08G 1/0104; G08G 1/096827; G08G 1/096844; G08G 1/20
  See application file for complete search history.

(56) References Cited

U.S. PATENT DOCUMENTS

| | | |
|---|---|---|
| 6,621,452 B2 | 9/2003 | Knockeart et al. |
| 8,160,814 B2 | 4/2012 | Nakamura et al. |
| 8,392,367 B2 | 3/2013 | Moribe et al. |
| 9,435,654 B2 | 9/2016 | Ibrahim et al. |
| 10,331,709 B2 | 6/2019 | Yano et al. |
| 10,429,194 B2 | 10/2019 | Wheeler |
| 10,474,162 B2 | 11/2019 | Browning et al. |

(Continued)

FOREIGN PATENT DOCUMENTS

| | | | |
|---|---|---|---|
| DE | 10 2019 002 161 A1 | 9/2019 | |
| WO | WO-2021001018 A1 * | 1/2021 | ............ B60W 30/12 |

*Primary Examiner* — Ig T An
*Assistant Examiner* — Stephanie T Su
(74) *Attorney, Agent, or Firm* — Oblon, McClelland, Maier & Neustadt, L.L.P.

(57) ABSTRACT

Methods and a system are described for prioritizing the upload of connected vehicle map data in a central mapping system. A central mapping unit includes a central server which receives and processes data uploads by priority order, from highest priority to lowest priority. The uploaded data is compared to central map data to determine whether the central map requires updating. When the central mapping unit determines that there is not enough information to update the central map in a region, a priority list is updated to give high priority to data collection in the region. The updated priority list is pushed to connected vehicles travelling in the region, which have external sensors for data collection in the surrounding environment. When a connected vehicle enters the region, its external sensors collect data regarding the region, which is uploaded to the central mapping unit with highest priority.

19 Claims, 9 Drawing Sheets

(56) References Cited

U.S. PATENT DOCUMENTS

| | | | |
|---|---|---|---|
| 2004/0034467 A1 | 2/2004 | Sampedro et al. | |
| 2019/0147331 A1 | 5/2019 | Arditi | |
| 2019/0293442 A1* | 9/2019 | Niewiadomski | G08G 1/0133 |
| 2019/0376795 A1 | 12/2019 | Linder | |
| 2020/0090322 A1* | 3/2020 | Seo | G06V 20/56 |
| 2020/0110414 A1* | 4/2020 | Dupre | B60W 60/0011 |
| 2021/0004363 A1* | 1/2021 | Bailly | G01C 21/3848 |
| 2021/0304018 A1* | 9/2021 | Usman | G06F 11/3409 |

* cited by examiner

PRIORITIZING UPLOADING OF MAP RELATED DATA FROM VEHICLES

BACKGROUND

Technical Field

The present disclosure is directed to a central mapping system in which a central map is updated based on map related data uploaded from vehicles registered with the central mapping system. The vehicles transmit the map related data according to a priority list, and the central mapping system receives the map related data according to its priority.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

"Connected vehicle" technologies allow vehicles to communicate with each other and the world around them through vehicle-to-vehicle (V2V) communication. Navigation systems already include connected vehicle functionality, such as dynamic route guidance. The GPS-based system receives information on congestion in the road ahead through cellular signals (3G, 4G or 5G LTE) and suggests an alternative route. The 5.9 GHz spectrum has been allocated to connected vehicle V2V communication. Without compromising personal information, this technology allows the connected vehicles to share vehicle data related to speed, location and trajectory.

Conventional technology currently requires a human to determine when part of the environment does not agree with an electronic map and provide a request to update the map with new information.

Accordingly, it is one object of the present disclosure to provide methods and a system for prioritizing the update of an electronic map at a central server. The present disclosure describes an improvement over the current technology in that the invention prioritizes receiving data for updating the electronic map and updates the priority list based on the received data.

SUMMARY

The present disclosure describes prioritizing the upload of connected vehicle map data.

A central mapping unit includes a central communication device, a central server, a central map, a registration database, a priority database and central memory. A plurality of connected vehicles are registered with the central mapping unit. The plurality of connected vehicles monitor their positions and observe the surrounding environment with their external sensors, such as cameras, LiDAR, radar and the like, with respect to a map route and collect sensor data when their positions or the observed environment does not match the expected data stored within the map. Collected data is matched to a vehicle priority list and uploaded to the central server.

The central server includes a first computing device operatively connected to the central communication device, the central map, the priority database, and the central memory, the first computing device including a computer-readable medium comprising program instructions, executable by first processing circuitry, to cause the first processing circuitry to upload vehicle map data transmitted by a plurality of connected vehicles in ascending order by a priority score, store the vehicle map data in ascending order by the priority score in the central memory and analyze the vehicle map data in ascending order by the priority score.

The analysis includes determining differences between the vehicle map data and the observed environment and the map data of a central map to detect a discrepancy region, determining whether more information is needed to update the central map in the discrepancy region, if more information is needed, updating the priority database to generate an updated priority list and immediately transmitting the updated priority list to those connected vehicles travelling in the discrepancy region. If no more information is needed, calculating a confidence score for updating the central map and determining whether the confidence score is greater than a threshold confidence score. If the confidence score equals or is greater than a threshold confidence score, updating the central map with the vehicle map data and transmitting an updated central map to the connected vehicles during a scheduled update, if the confidence score is less than the threshold confidence score, storing the vehicle map data.

Each connected vehicle further includes an onboard communications unit, a GPS antenna for receiving GPS position signals identifying the coordinates of the connected vehicle, at least one external sensor operatively configured to collect sensor data of an environment surrounding the connected vehicle, a second computing device operatively connected to the vehicle map, the vehicle priority list, an onboard communications unit, a vehicle memory, the GPS antenna and the at least one external sensor, the second computing device including a computer-readable medium comprising program instructions, executable by second processing circuitry, to cause the second processing circuitry to compare the coordinates to map data of the vehicle map, detect differences between the coordinates and the map data, gather sensor data by at least one vehicle external sensor, combine the differences and the sensor data to generate a set of discrepancy data and match the set of discrepancy data to a vehicle priority list to determine a priority score If the priority score is a low number, form a first data packet of the differences, sensor data and priority score and upload the data packet to the central mapping unit, and if the priority score is not a low number, store in vehicle memory the set of discrepancy data and the sensor data with the priority score.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
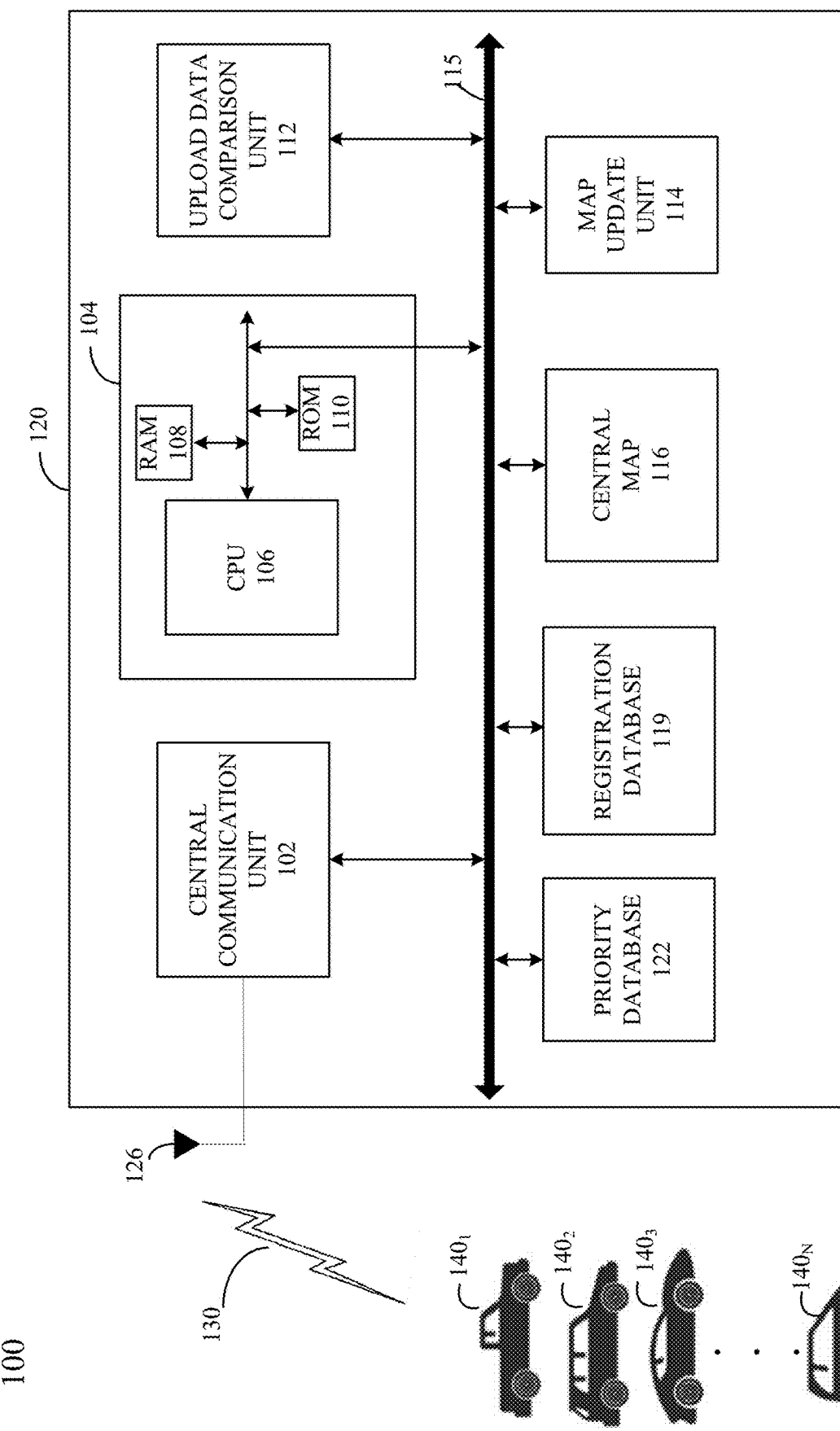
FIG. 1 is an illustration of a central mapping system, according to certain embodiments.

In the drawings, like reference numerals designate identical or corresponding parts throughout the several views. Further, as used herein, the words "a," "an" and the like generally carry a meaning of "one or more," unless stated otherwise. Furthermore, the terms "approximately," "approximate," "about," and similar terms generally refer to ranges that include the identified value within a margin of 20%, 10%, or preferably 5%, and any values therebetween.

The present disclosure describes a system and methods for prioritizing data upload from a connected vehicle to update a central map.

A central mapping system may be configured to update the central map based on new data received from one or more vehicles registered with and operatively connected to the central mapping system. The central mapping system is able to prioritize when a vehicle uploads data from the vehicle to a central server to update the central map. Therefore the system will not be inundated with significant amounts of data that may not be important.

Each vehicle registered with the central mapping system stores a vehicle map in ROM or within a separate memory for map data. The vehicle map may be a subset of the central map. For example, a vehicle located in North America would not need a map for Europe or South America. When a route is input to the vehicle map, the portion of the central map relevant to its planned route may be updated by communication with the central mapping system. Storage in the vehicle memory is limited, thus only the needed portion of the vehicle map is updated, not the entire vehicle map.

Alternatively, the central mapping system may include a private RF communication band for communicating with vehicles equipped with the map. In this situation, no subscription is needed as all communication would then be secured over the private RF communication band and the permissions for communication would be granted through access to the private RF communication band. In another alternative, communication between the central map and the vehicle map may be through a computer application, which is downloaded to the vehicle. The process of negotiating the download of the app would include permissions for communicating between the central mapping server and the vehicle onboard communications unit. In a further alternative, the vehicle may communicate through an open WiFi channel or request access to home/garage networks and then auto negotiate the connection.

At the time of update, the central mapping server pushes a priority list relevant to the planned route to the vehicle map. The priority list defines the immediacy of uploading update information from the vehicle map to the central map server. When the vehicle computing device detects a discrepancy between the vehicle map and the trajectory of the vehicle, the vehicle external sensors collect data from the surrounding environment. The vehicle may also connect with other vehicles in the area of the discrepancy to collect their sensor data. From this data, the vehicle computing device determines details of the discrepancy, such as distance of the vehicle from the discrepancy, type of discrepancy (accident, construction change, lane change, detour, obstruction in roadway, pothole, vehicle velocity change, and the like) and road rank on which the vehicle is travelling (main road, expressway, city street, toll road, side road, and the like). These details are matched against the priority list to determine a priority score for sending an update to the central server. The priority list may include a set of priority lists, each priority list having a score. A weighted sum or an average of the priority list scores may be calculated to determine the immediacy of the update. Conventional details of map distribution by a central server and the inclusion of a priority list may be found in U.S. Pat. No. 8,160,814 B2, incorporated herein by reference in its entirety.

Generally, the central mapping system prioritizes situations where the map data may be incorrect. If the map data is incorrect, a vehicle accident may occur. If a vehicle accident occurs because of incorrect map data, the central map highly prioritizes data from the area where the map may be incorrect so that the central map can determine if the map needs to be updated and can perform the necessary updates.

In an example, if the vehicle is near an accident (or involved in an accident), the central mapping system prioritizes the uploading of data from the vehicle to the central server. Therefore, vehicles which are collecting extremely valuable data, such as accident related data, are given priority to upload data to the central server. In another example, if it is determined that a construction zone is no longer under construction, vehicles entering the construction zone could be given higher priority to upload data sourced from the construction zone so as to update the central map with any changes that occurred during construction.

The central mapping server receives the update with the priority score from the vehicle. The update may contain only data that is different from the vehicle map data, rather than including the entire map section. The central mapping server is configured to determine, from the priority score, whether the update should be sent to the central map. The central mapping server may drop the update, retain the update, send the update to the central map or push the update back to the vehicle. The central mapping unit may prioritize updates from vehicles in the vicinity of the discrepancy. The priority list may be updated by the central mapping system to include the vicinity of the discrepancy as a high priority region and then be pushed to other vehicles in the vicinity, which are registered with and operatively connected to the central mapping system.

In another example, the priority list may be updated to give higher priority to updates in known construction zones or other areas of interest.

Since data storage on vehicles is limited and upload bandwidth is limited, the vehicle must make decisions as to whether to keep data, drop data or upload data and may determine when data upload is critical by reference to the priority list.

The vehicle uses its last best priority list when there is no cloud connectivity. When the vehicle is able to send its update data to the central mapping server, the server uploads the update data by the latest priority order.

If a high priority update is sent by the vehicle, the central mapping system may update its priority list and push the updated list back to the vehicle with a request that the vehicle request data from other connected vehicles in the vicinity regarding the discrepancy and include that information in a high priority update.

The vehicle system may normally upload data which is not critical (as determined from the priority list) when it is connected to WiFi. If the data is high priority, the vehicle system may upload the data immediately and at any time through its cellular system. As the storage on the vehicle is limited, the vehicle system makes the decision to retain the data, drop the data or upload the data, and preferentially retains and/or uploads high priority data. Further, the vehicle may communicate with other autonomous/connected vehicles in the critical area to obtain data collected from viewpoints the vehicle cannot detect, and include this information in the update.

The vehicle senses the road environment by its external sensors (cameras, LiDAR, radar, far infrared (FIR), and the like). If the vehicle is not travelling on the route planned on the internal vehicle map, such as the vehicle has stopped or leaves the roadway, or the vehicle detects a discrepancy between what is reported by the map and its own sensors, the vehicle uses its external sensors to gather data to upload to the external map. The vehicle decides a level of importance of the sensor data. Based on the level of importance, the vehicle references the priority list, which determines whether the vehicle should update the central server with its collected data immediately, through its cellular communications or over a private RF communications band, or at a later time, when connected to WiFi or when in an area of high data connectivity.

Additionally, the vehicle system may communicate with other connected vehicles in the discrepancy vicinity to obtain data collected from viewpoints the vehicle system cannot detect, and include this information in the update.

For example, if the vehicle is in an accident due to incorrect map information, a high level of importance is determined. This situation would match the first priority level for uploading data to the central server.

If the vehicle determines that the level of importance is low, for example, the vehicles and surrounding vehicles are leaving the roadway because a box has fallen onto one of the lanes, the vehicle may update its internal map to navigate the lane change, and drop the update after passing the discrepancy. In an example of medium importance, if a speed limit sign is down and vehicles are travelling faster than the speed limit, the vehicle matches the observation to the priority list which determine the medium priority of the observation. The update to the central mapping server can occur later during a scheduled update. The priority list can include prioritizing update information according to the geographic area represented by the update information and transmitting the update information in order of the priority.

In general, highest priority is assigned to map discrepancies that may cause dangerous conditions for vehicles. Lowest priority is assigned to non-persistent discrepancies, which are unlikely to be dangerous.

FIG. 1 illustrates the central mapping system 100. The central mapping system 100 includes a central mapping unit 120, and connected vehicles ($140_1, 140_2, \ldots, 140_N$), which are registered with the central mapping unit 120 through a subscription or other registration process and operatively connected to the central mapping unit 120 through communication link 130. Communication link 130 may be any wireless channel, such as WiFi, 3G, 4G and 5G LTE communication channels.

The central mapping unit 120 includes a central communication unit 102 connected to the communication link 130 through antenna 126, a central server 104, an upload data comparison unit 112, a map update unit 114, a central map 116, a registration database 119, which stores identification numbers of vehicle maps registered with the central mapping unit 120 and a priority database 122, which stores the priority list(s). A communications bus 115 serves to operatively connect the components (102, 108, 110, 112, 114, 116, 119, 122) of central mapping unit 120 to the CPU 106 of central server 104.

Central server 104 includes computer processing unit (CPU) 106, RAM 108 and ROM 110. CPU 106 may be a microprocessor, a multi-core processor, or a plurality of distributed processing units, and is not limited as to type or form. The CPU 106 serves as a computational unit and as a control unit that executes an overall control of the server. The RAM 108 is used as a working memory when the CPU 106 executes various computational processing. The ROM 110 stores various control programs for executing map update processing or the like.

Central server 104 is "centralized" in that it provides services at one location for vehicles that are distributed throughout a geographic area. The central server's location does not have to be "central" or even located in the same geographic area as the vehicles it services. Also, although the system is described in terms of a single central server 104, multiple servers can alternatively be used. When multiple servers are used, in-vehicle systems can be configured to access particular servers for all, or for particular types of, service requests.

The central communication unit 102 is operatively connected to the central server 104 and receives the data uploaded by the connected vehicles ($140_1, 140_2, \ldots, 140_N$) according to the priority order. For example, if vehicle $140_1$ transmits update information having a priority rating of 8 and vehicle $140_2$ transmits update information having a priority score of 2 at the same time, the central communication unit will receive the update from vehicle $140_2$ before the update from vehicle $140_1$. Additionally, if the update from the vehicle is a plurality of updates each having a priority score, the central communication unit will receive the update having the highest priority first, and then each update in priority order.

As the updates from the connected vehicles (any of $140_1, 140_2, \ldots, 140_N$) are received, the central server 104 stores the updates temporarily in RAM 108. Upload data comparison unit 112 accesses the relevant portion of the central map 116 and compares the upload data stored in the RAM to the relevant portion of the central map to detect differences between the upload data and the central map data. The map update unit 114 determines whether or not the relevant portion of the map should be updated with the "new" data. The map update unit 114 updates the map data stored in the central map 116 when high priority data is uploaded from one or more of the registered vehicles $140_1, 140_2, \ldots, 140_N$. The map update unit 114 may receive updates from a plurality of vehicles in the vicinity of the discrepancy and calculate a confidence score which determines whether or not the map should be updated. The confidence score may be determined by the priority score of the upload data and the number of uploads of data from vehicles which report the same discrepancy. A threshold number of reports of the discrepancy may need to be met before the confidence score is high enough to update the central map 116. The threshold number may be different for each priority score. The difference data is used for updating a portion of the map information to a new version of the map.

The CPU may make a decision as to whether or not the update data completely defines the discrepancy. For example, if an accident has occurred because a section of roadway was not fully mapped, the CPU may update the priority list stored in the priority database 122 and push the updated priority list to any of connected vehicles ($140_1$, $140_2$, ..., $140_N$) travelling in the vicinity of the discrepancy, in order to gather high priority updates of the vicinity.

Figure 2:
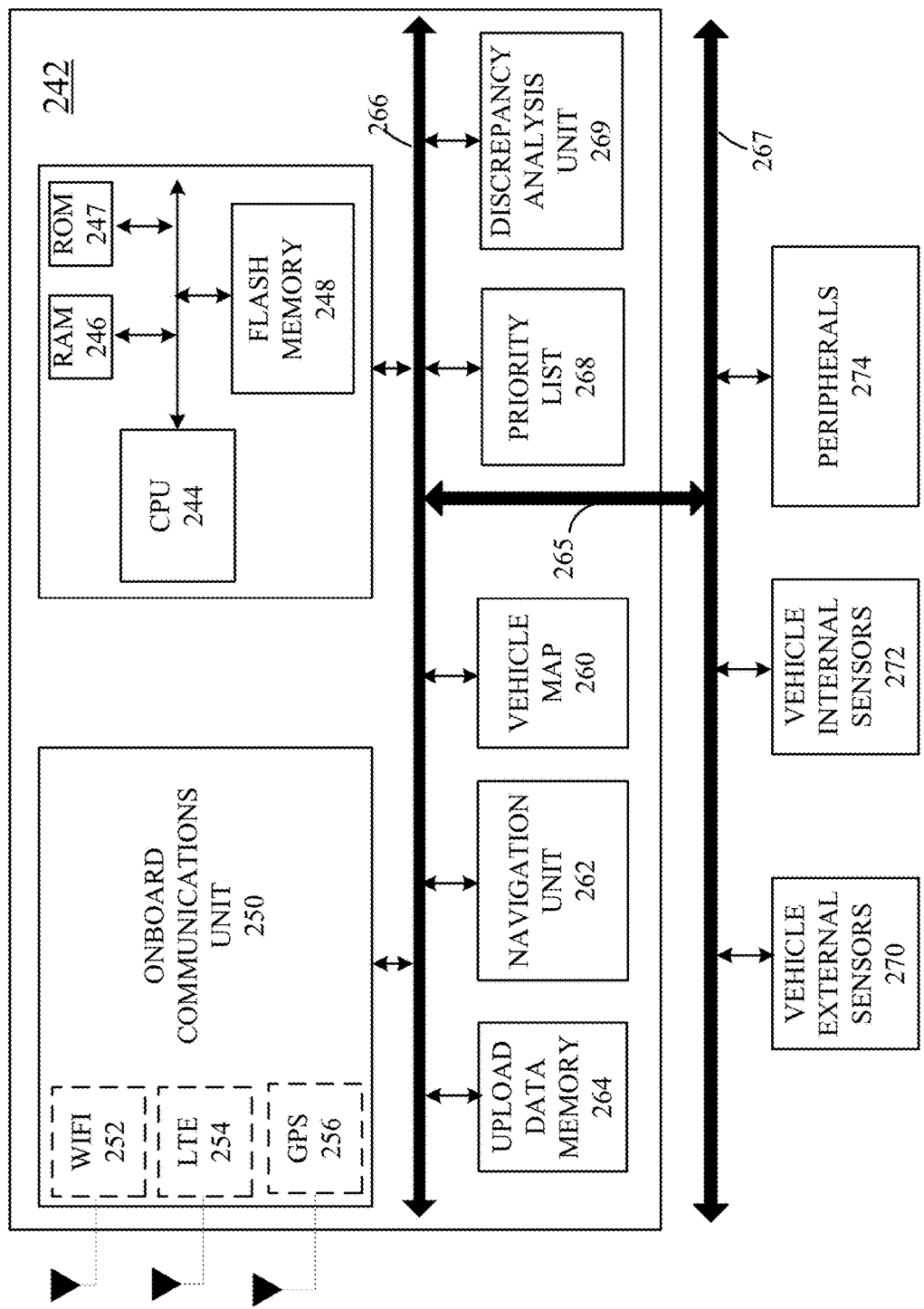
FIG. 2 is an illustration of a central mapping unit, according to certain embodiments.

FIG. 2 illustrates portions of a vehicle computing device 242 relevant to the vehicle map. A vehicle computing device 242 is installed in each of vehicles $140_1$, $140_2$, ..., $140_N$ of FIG. 1. The vehicle computing device 242 includes an onboard communications unit 250 having WiFi 252, LTE 254 and GPS 256 antennas, electrical circuitry (not explicitly shown) for transmitting and receiving signals over the antennas. The onboard communications unit 250 is connected to CPU 244, which includes RAM 246, ROM 247 and flash memory 248. CPU 244 may be a microprocessor, a multi-core processor, or a plurality of distributed processing units. The CPU 244 serves as a computational unit and as a control unit that executes the data prioritization of the present disclosure. The RAM 246 is used as a working memory when the CPU 244 executes various computational processing. The ROM 247 stores various control programs as well as map update processing programs for executing the map update, data collection, priority list matching and data prioritization. The flash memory 248 stores programs read out from the ROM 247. Communication bus 266 operatively connects the components of the vehicle communication device 242 to the CPU 244. Communications buses 265 and 267 connect vehicle sensors and peripherals to the communications bus 266.

The onboard communications unit 250 executes communications with the central communication unit 102 of the central mapping unit 120 of FIG. 1. Additionally, the onboard communications unit 250 communicates with connected vehicles in the vicinity of a discrepancy to collect additional data. The onboard communications unit 250 also includes a GPS antenna and circuitry to determine the position of each connected vehicle with respect to the roadway and locate each connected vehicle on the vehicle map 260.

The vehicle computing unit also receives data from vehicle external sensors 270, such as cameras, LiDAR, radar, FIR sensors regarding the external environment surrounding the vehicle. Vehicle internal sensors 272 provide information regarding speed, mileage, yaw, cant, and the like, which are used by the navigation unit 262 to determine the road condition, speed of the vehicle, curvature of the road surface and the like. A satellite navigation device, called a global positioning satellite (GPS) receiver, is a device that is capable of receiving information from global navigation satellite system (GNSS) satellites and then calculates the vehicle's geographical position. The vehicle computing device may display the geographical position on the vehicle map, and may offer routing directions. The navigation unit also uses the positioning information provided by the GPS antenna to determine the coordinates of the vehicle and positions of surrounding vehicles from a satellite map. The navigation unit 262 stores information that is required for route guidance and to display maps.

Peripherals 274 generally include a display, speakers and control panel for programming route information into the navigation unit.

CPU 244 compares GPS position information and data from the external and internal sensors to the vehicle map 260. When a discrepancy occurs between the vehicle map data and the actual position and environment of the vehicle, the difference data is applied to the discrepancy analysis unit 269, which determines the type of discrepancy, such as road ends, vehicle lane change not previously shown on the map, road changes due to construction, unmapped areas, obstructions in the road, accidents, unexpected speed changes, sharp curves not previously reported and the like. The discrepancy analysis unit 269 accesses information such as road type, for example, toll road, expressway, city street, two-lane highway, four-lane highway, and the like, from the vehicle map. The discrepancy analysis unit 269 further accesses the distance of the vehicle from the discrepancy from the navigation unit 262. The discrepancy type, road type and distance of the vehicle from the discrepancy vicinity, are matched to a score on the priority list. The priority list may include multiple priority tables, each having a priority score, and the priority scores may be averaged or a priority score may be calculated from summing weighted scores of each priority table. For example, the priority list may include a discrepancy type priority table, a road type priority table, a distance priority table and the like.

Depending on the priority score, the update package may be sent at during a scheduled update time window over WiFi or may be sent immediately over the LTE antenna. Since storage on the vehicle is limited, a low priority update may be dropped when the upload data memory is needed to hold a higher priority update.

Figure 3:
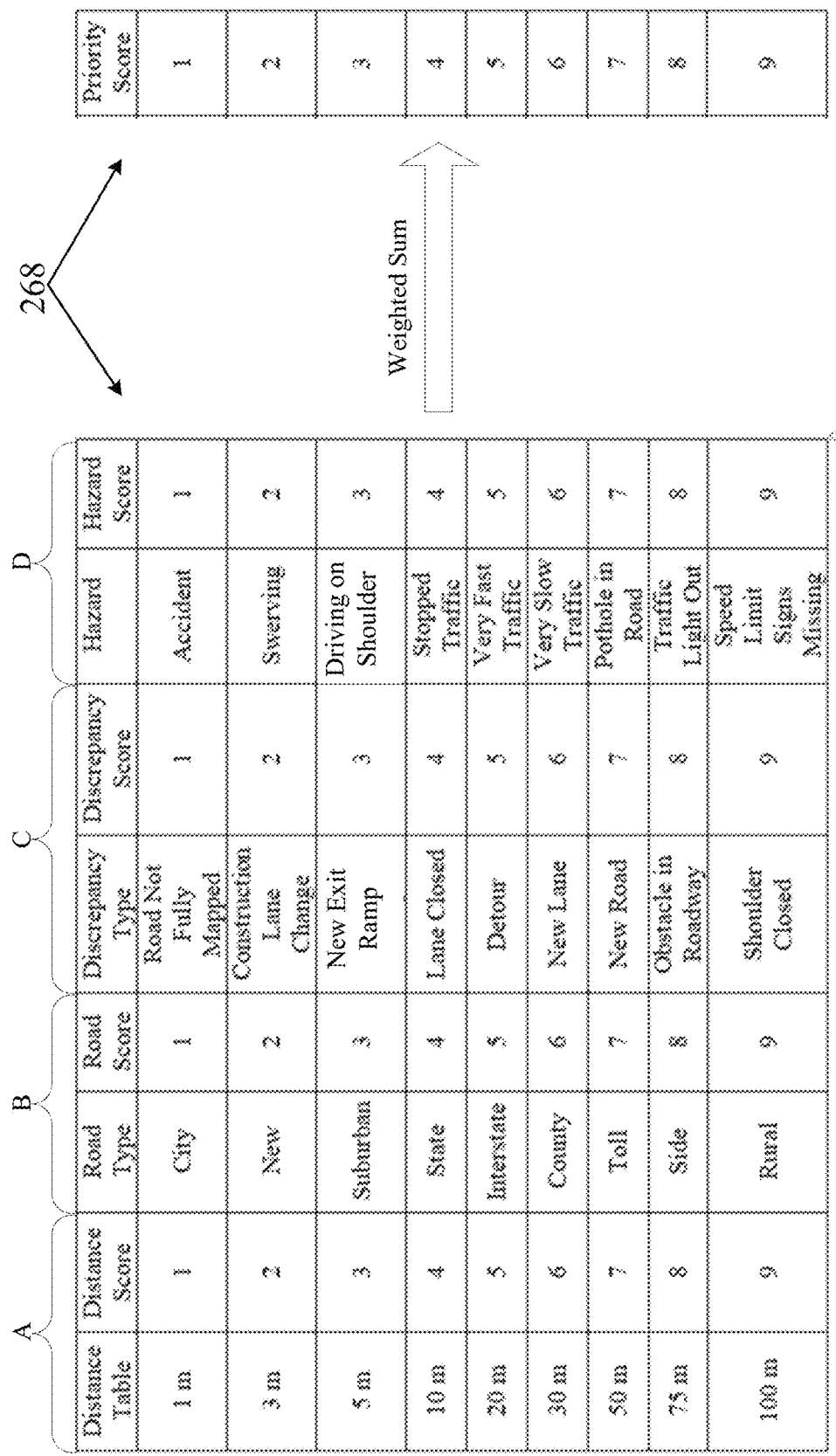
FIG. 3 shows a priority list, according to certain embodiments.

FIG. 3 is an example of a priority list 268. The priority list is exemplary only and the scores and descriptors may differ for each route navigated. The priority list 268 may include priority tables A, B, C and D. The distance from the discrepancy, the road type, the discrepancy type and a hazard score each may have a score. A weighted sum of the scores may be calculated to determine the priority score.

In a non-limiting example, for a vehicle travelling on a county road (score 6), the vehicle external sensors may determine that there is a construction lane change (score 2) 50 meters (score 7) ahead and vehicles are driving on the shoulder (score 3) of the road. The distance score may have a weight of 0.2, the road type score may have a weight of 0.2, the discrepancy score may have a weight of 0.3 and the hazard score may have a weight of 0.3. A calculation of the weighted sum results in a priority score of 5. An exception is made if the hazard is an accident caused by an incorrect mapping. In this situation, the priority score is 1.

The highest priority for updating is given to data having the lowest priority score. The lowest priority is given to data having a high priority score, for example, a priority score of 1 gives the highest priority to uploading a data update packet and a priority score of 9 (exemplary only), gives the lowest priority for uploading a data packet, and may be sent during a scheduled update session or may be dropped.

FIG. 4A-FIG. 4D are flowcharts of the upload process of the present disclosure. Each flowchart depicts processes performed the CPU 106 of the central mapping unit 120 and processes performed by the CPU $244_{1-N}$ of the vehicle computing systems $242_{1-N}$ of any of the connected vehicles $140_{1-N}$ as these processes relate to the vehicle map and communications through the wireless communications link 130.

Figure 4A:
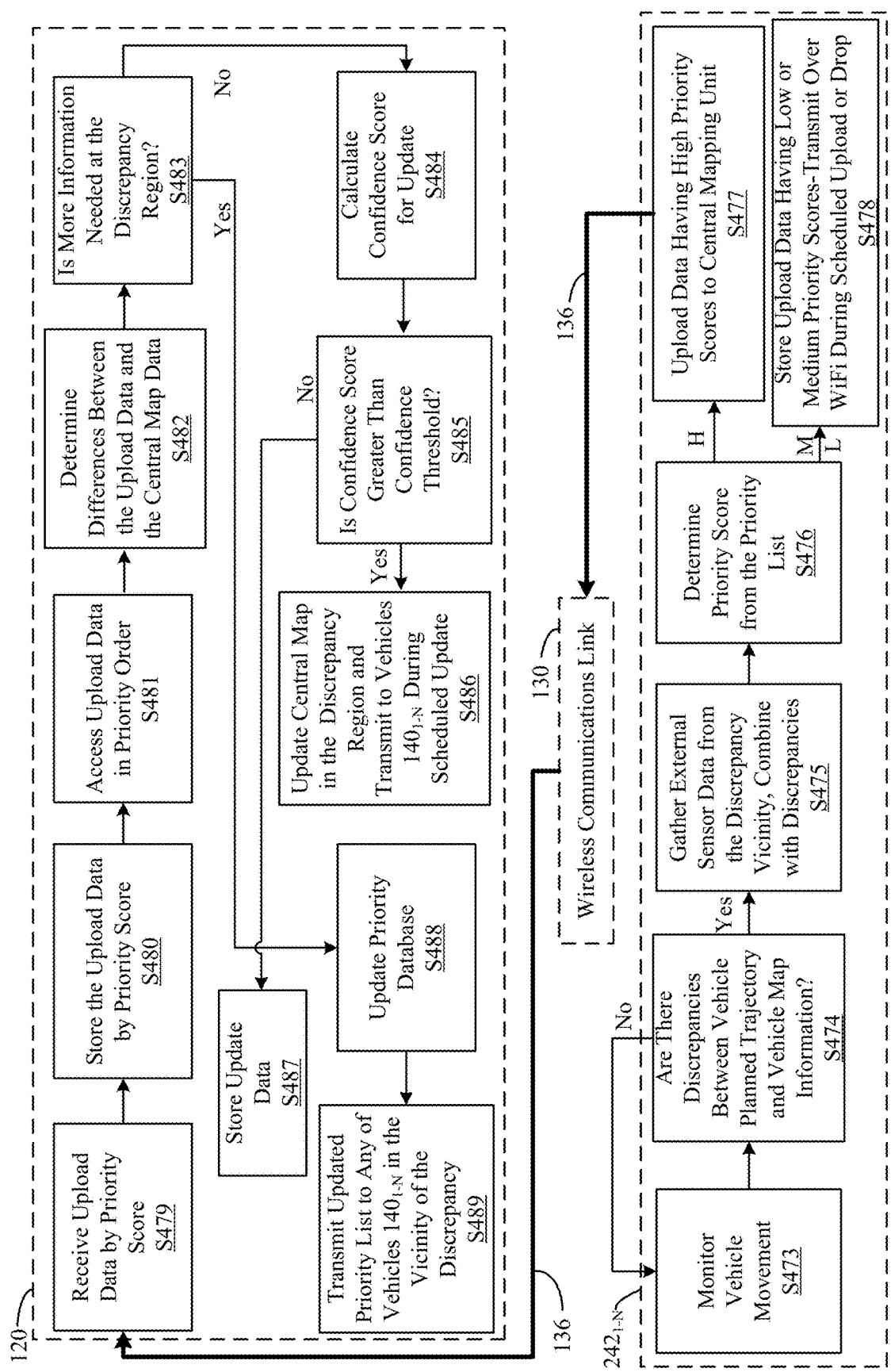
FIG. 4A is an exemplary flowchart of prioritizing upload data, according to certain embodiments.

FIG. 4A illustrates the steps performed by each vehicle computing device $242_{1-N}$ of connected vehicles ($140_1$, $140_2$, ..., $140_N$), which are registered with the central mapping unit 120 through a subscription or other registration process and operatively connected to the central mapping unit 120 through communication link 130. Each vehicle computing device $242_{1-N}$ includes a vehicle map 260, which is a portion of the central map 116.

At step S473, the vehicle computing device, $242_i$, where I=1-N, monitors the movement of the vehicle on the roadway and the environment surrounding the vehicle according to a planned route programmed in to the vehicle map 116. The vehicle may monitor the movement by data received through its GPS antenna and the surrounding environment by its external sensors. At step S474, the vehicle determines whether there are discrepancies between the planned trajectory of the vehicle on the roadway, the observed environment and the vehicle map information. If YES, then the vehicle gathers sensor data of the surrounding environment in the vicinity of the discrepancy at step S475. If NO, the process returns to step 473 to monitor the vehicle movement.

At step S476, the vehicle determines the priority score from its last best priority list as described above with respect to FIG. 3. The discrepancy data and data from the external sensors are combined with the priority score to form an upload packet. At S477, upload packets having high priority (e.g., priority scores of 1 or 2) are uploaded through wireless communication link 130 to central mapping unit 120. At S478, upload packets having medium or low priority (e.g., priority scores greater than 2) are stored for upload when the vehicle is connected to WiFi or in an area of high data connectivity. Upload packets having low priority (e.g., priority scores greater than 6) may be dropped if more memory is needed to store higher priority packets during the course of navigating the vehicle before the scheduled update.

At the central mapping unit 120, at step S479, the upload packet is received by the central communications unit 102 by priority score, where the highest priority upload packets are received first. For example, central communications unit 102 may receive upload packets from vehicles $140_1$ and $140_2$ at the same time. The upload packet of vehicle $140_1$ may have a priority score of 2 and the upload packet of vehicle $140_2$ may have a priority score of 1. The central communications unit will receive the upload packet from vehicle $140_2$ before the upload packet of vehicle $140_1$.

At step S480, the upload packets are stored by priority score. At step S481, the central mapping server 104 accesses the upload data in priority order. At step S482, the CPU 106 sends the upload data to the upload data comparison unit 112 to determine the differences between the upload data and the central map data. At step S483, the map update unit determines whether to update the central map. First, the map update unit determines whether more information is needed from the discrepancy region in order to perform an update of the map. If NO, then the confidence score for the update is calculated based on the priority score and the number of vehicles reporting the discrepancy, at step S484. At step S485, the map update unit determines whether the confidence score is greater than a confidence threshold level. If NO, the upload data is stored at S487 for later retrieval if more vehicles report the discrepancy. If YES, at S486, the map update unit updates the central map in the discrepancy region and transmits the map to vehicles $140_{1-N}$ during a scheduled update.

Returning to step S483, if more information is needed from the discrepancy region, the priority database is updated at step S488 and an updated priority list is transmitted at S489 to any of the vehicles $140_{1-N}$ which are in the vicinity of the discrepancy. For example, vehicle $140_1$ may have reported the discrepancy in a high priority data upload, but has subsequently moved out of the vicinity of the discrepancy. The central server of the central mapping unit 120 may transmit the updated priority list only to those vehicles, for example, vehicles $140_2$, $140_3$, $140_7$ which are still in the vicinity of the discrepancy.

Figure 4B:
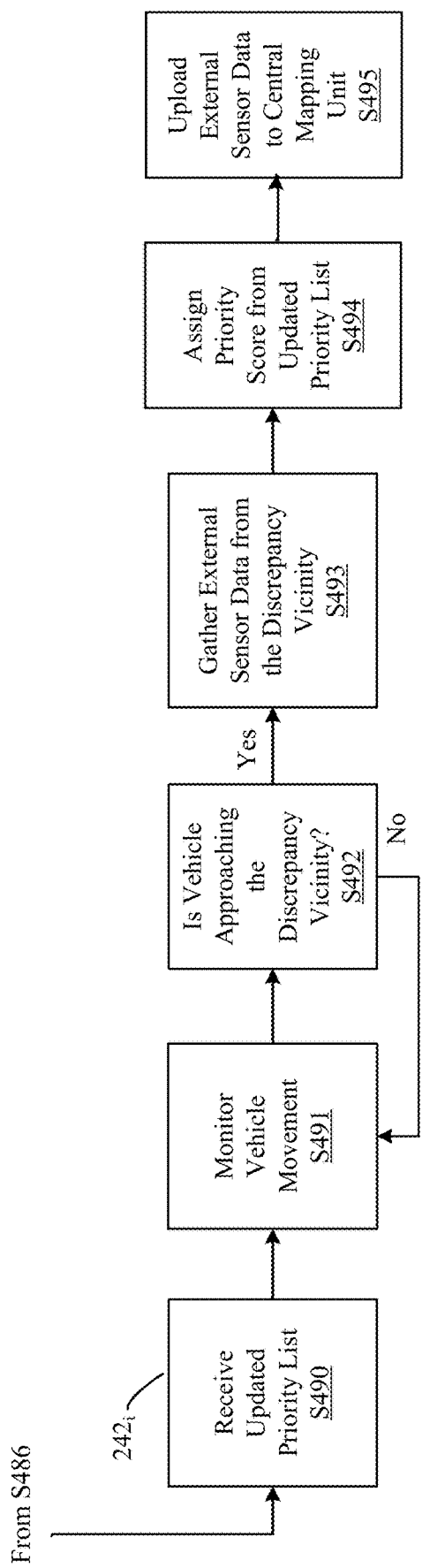
FIG. 4B is an exemplary flowchart using an updated priority list, according to certain embodiments.

In FIG. 4B, a flowchart is shown of the process taken by the computing device $242_i$ of a vehicle $140_i$ which has received the updated priority list. At S490, the onboard communications unit 250 receives the updated priority list from step S486 of FIG. 4A. The vehicle monitors vehicle movement at S491. At S492, the vehicle computing device determines if the vehicle is approaching the discrepancy vicinity. If NO, the process returns to S491 to continue to monitor the vehicle movement. If YES, the process moves to S493, where the vehicle computing device gathers external sensor data from the discrepancy vicinity. At S494, a high priority score is assigned from the updated priority list. At S495, the data is uploaded to the central mapping unit 120 with high priority.

The first embodiment is illustrated with respect to FIG. 1-FIG. 8. The first embodiment describes a method for prioritizing the upload of vehicle map data by a central mapping unit 120, comprising uploading vehicle map data transmitted by a plurality of connected vehicles ($140_1$, $140_2$, ..., $140_N$, FIG. 1) in ascending order by a priority score (S479, FIG. 4A), each connected vehicle registered (see registration database, 119) with the central mapping unit 120, storing the vehicle map data in ascending order by the priority score (S480, FIG. 4A), analyzing the vehicle map data in ascending order by the priority score, wherein the analyzing incudes determining differences (S482, S483, FIG. 4A) between the vehicle map data (260, FIG. 2) and map data of a central map (116, FIG. 1) to detect a discrepancy region, determining (S483, FIG. 4A) whether more information is needed to update the central map in the discrepancy region, when more information is needed, updating (S488) a central priority database (122, FIG. 1) to generate an updated priority list and immediately transmitting (S489) the updated priority list to those connected vehicles travelling in the discrepancy region, when no more information is needed (S483, NO), calculating a confidence score for updating the central map (S484) and determining whether the confidence score is greater than a threshold confidence score (S485), when the confidence score equals or is greater than a threshold confidence score, updating (S486) the central map 116 with the vehicle map data and transmitting an updated central map to the connected vehicles during a scheduled update (S486), and when the confidence score is less than the threshold confidence score (S485, NO), storing (S487) the vehicle map data.

The method includes updating the central priority list to give highest priority to data collected from the discrepancy region.

The method includes updating the central priority list to give highest priority to data collected by at least one external sensor (270, FIG. 2) of a connected vehicle (any of $140_1$, $140_2$, ..., $140_N$, FIG. 1) travelling in the discrepancy region.

The method includes updating the central priority database to give highest priority to data collected by at least one external sensor of a connected vehicle travelling in the discrepancy region, the at least one external sensor selected from the group including a camera, a light detection and ranging (LiDAR) sensor, a radar sensor and a far infrared (FIR) sensor.

The method includes calculating a confidence score based on the priority order and a number of the connected vehicles which upload map data collected in the discrepancy region.

The method includes selecting a confidence score threshold based on traffic volume in the discrepancy region, a type of roadway on which the connected vehicles are travelling and a type of discrepancy.

The method includes transmitting the updated priority list over a cellular communication network.

The method includes transmitting the updated central map to the connected vehicles during a scheduled update over a WiFi communications link.

The method includes transmitting the updated priority list to the connected vehicles over an RF communications band owned by the central mapping unit.

The method includes receiving a request to register a connected vehicle with the central mapping unit, registering (see registration database 119, FIG. 1) the connected vehicle, transmitting a portion of the central map to the connected vehicle, and transmitting a priority list to the connected vehicle.

The second embodiment is illustrated with respect to FIG. 1-FIG. 8. The second embodiment describes a method for prioritizing the upload of vehicle map data by a connected vehicle (any of $140_1$, $140_2$, ..., $140_N$, FIG. 1) registered with a central mapping unit 120, comprising receiving GPS (see GPS antenna 256, FIG. 2) position signals identifying the coordinates of the connected vehicle, comparing the coordinates to map data of a vehicle map 260, detecting differences (S474, FIG. 4A) between the coordinates and the map data, gathering sensor data (S475, FIG. 4A) by at least one vehicle external sensor (270, FIG. 2), combining the differences and the sensor data (S475) to generate a set of discrepancy data, matching the set of discrepancy data to a vehicle priority list 268 to determine a priority score (S476, FIG. 4A), when the priority score is a low number, forming a first data packet of the differences, sensor data and priority score and uploading the data packet to the central mapping unit (S477), and when the priority score is not a low number, storing (S478) in vehicle memory (ROM 247, FIG. 2) the set of discrepancy data and the sensor data with the priority score.

The method includes dropping (S478) a set of discrepancy data having a high number (i.e., low priority) when the vehicle memory is full and the vehicle memory is needed to store a set of discrepancy data having a lower number.

The method includes identifying that the vehicle has entered an area of high data connectivity, forming a second data packet from each set of discrepancy data and its priority score stored in the vehicle memory, and uploading (S478) the second data packet to the central mapping unit over a data connection during a scheduled update session.

The method includes identifying nearby connected vehicles, transmitting requests to the nearby connected vehicles to share external sensor data of the discrepancy region, receiving the external sensor data from the nearby connected vehicles, and combining the external sensor data from the nearby connected vehicles with the discrepancy data.

The third embodiment is illustrated with respect to FIG. 1-FIG. 8. The third embodiment describes a system 100 for prioritizing the upload of connected vehicle map data, comprising a central mapping unit 120 including a central communication unit 102, a central server 104, a central map 116, a registration database 119, a priority database 122 and central memory (RAM 108 and ROM 110), a plurality of connected vehicles (any of $140_1$, $140_2$, ..., $140_N$, FIG. 1), each connected vehicle registered with the central mapping unit, each connected vehicle including a vehicle map 260 and a vehicle priority list 268 (FIG. 2), wherein the central server includes a first computing device (CPU 106, FIG. 1) operatively connected (through bus 115) to the central communication device 102, the central map 116, the priority database 122, and the central memory (RAM 108 and ROM 110), the first computing device including a computer-readable medium comprising program instructions, executable by first processing circuitry, to cause the first processing circuitry to upload vehicle map data transmitted by a plurality of connected vehicles in ascending order by a priority score (S479, FIG. 4A), store the vehicle map data in ascending order by the priority score (S480) in the central memory, analyze the vehicle map data in ascending order by the priority score, wherein the analysis includes determining differences between the vehicle map data and map data of a central map to detect a discrepancy region (S482), determining whether more information is needed (S483) to update the central map in the discrepancy region, when more information is needed (S483, YES), updating the priority database (S488) to generate an updated priority list and immediately transmitting the updated priority list (S489) to those connected vehicles travelling in the discrepancy region. When no more information is needed (S483, NO), calculating a confidence score (S484) for updating the central map and determining whether the confidence score is greater than a threshold confidence score (S485), when the confidence score equals or is greater than a threshold confidence score (S485, YES), updating the central map (S486) with the vehicle map data and transmitting an updated central map to the connected vehicles during a scheduled update and when the confidence score is less than the threshold confidence score (S485, NO), storing the vehicle map data (S487). As shown with respect to FIG. 2, each connected vehicle includes an onboard communications unit 250, a GPS antenna 256 configured to receive GPS position signals identifying the coordinates of the connected vehicle, at least one external sensor 270 operatively configured to collect sensor data of an environment surrounding the connected vehicle, a second computing device (CPU 244) operatively connected to the vehicle map 260, the vehicle priority list 268, an onboard communications unit 250, a vehicle memory (RAM 246 and ROM 247), the GPS antenna 268 and the at least one external sensor 270, the second computing device including a computer-readable medium comprising program instructions, executable by second processing circuitry, to cause the second processing circuitry to compare the coordinates to map data of the vehicle map (monitor vehicle movement, S473, FIG. 4A), detect differences (S474) between the coordinates and the map data, gather sensor data by at least one vehicle external sensor (S475), combine the differences and the sensor data to generate a set of discrepancy data, match the set of discrepancy data to a vehicle priority list to determine a priority score (S476), when the priority score is a low number, form a first data packet of the differences, sensor data and priority score and upload the data packet to the central mapping unit (S477), and when the priority score is not a low number, store in vehicle memory the set of discrepancy data and the sensor data with the priority score (S478).

The system further includes wherein the first processing circuitry (CPU 106, FIG. 1) is further configured to update the central priority database 122 to give highest priority to data collected by at least one external sensor of a connected vehicle travelling in the discrepancy region, the at least one external sensor selected from the group including a camera, a LiDAR sensor, a radar sensor and a far infrared sensor.

The system further includes wherein the first processing circuitry is further configured to calculate a confidence score based on the priority order and a number of the connected vehicles which upload map data collected in the discrepancy region, and a confidence score threshold is selected based on traffic volume in the discrepancy region, a type of roadway on which the connected vehicles are travelling and a type of discrepancy.

The system further includes wherein the first processing circuitry is further configured to transmit the updated priority list over a cellular communication network, and transmit the updated central map to the connected vehicles during a scheduled update over a WiFi communications link.

The system further includes wherein the second processing circuitry is further configured to drop a set of discrepancy data having a high number when the vehicle memory is full and the vehicle memory is needed to store a set of discrepancy data having a lower number.

Referring to FIG. 4B, the system further includes wherein the second processing circuitry (CPU 244, FIG. 2) is further configured to receive the updated priority list (S490), collect external sensor data while travelling in the discrepancy region (S493), match the external sensor data to the updated priority list, assign an updated priority score from the updated priority list (S494), and upload (S495) the external sensor data with the updated priority score to the central mapping unit.

Figure 5:
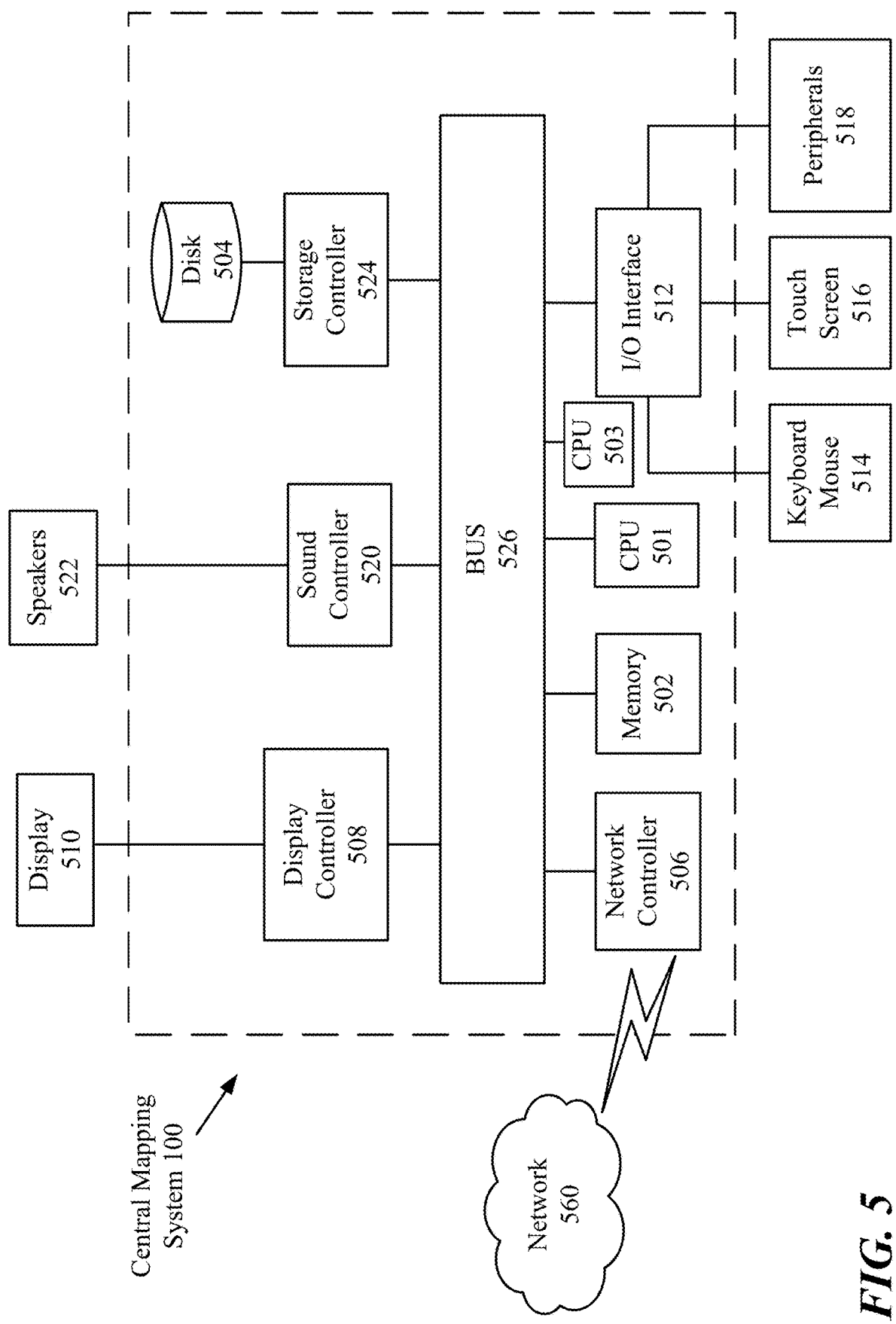
FIG. 5 is an illustration of a non-limiting example of details of computing hardware used in the computing system, according to certain embodiments.

Next, further details of the hardware description of the computing environment of FIG. 1 according to exemplary embodiments is described with reference to FIG. 5. In FIG. 5, a controller 500 is described is representative of the system 100 of FIG. 1 in which the controller is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN sub-networks. The network 560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
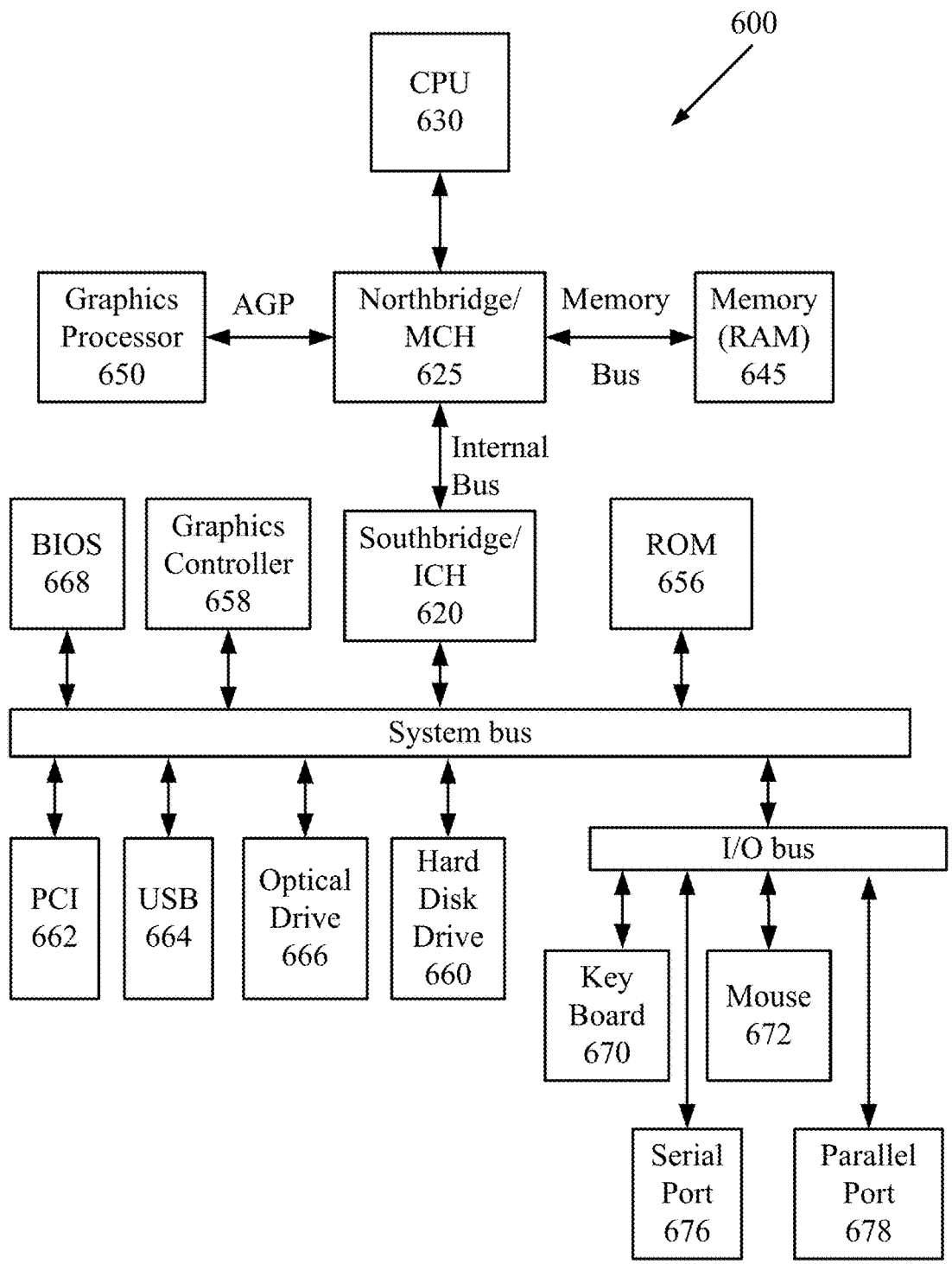
FIG. 6 is an exemplary schematic diagram of a data processing system used within the computing system, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
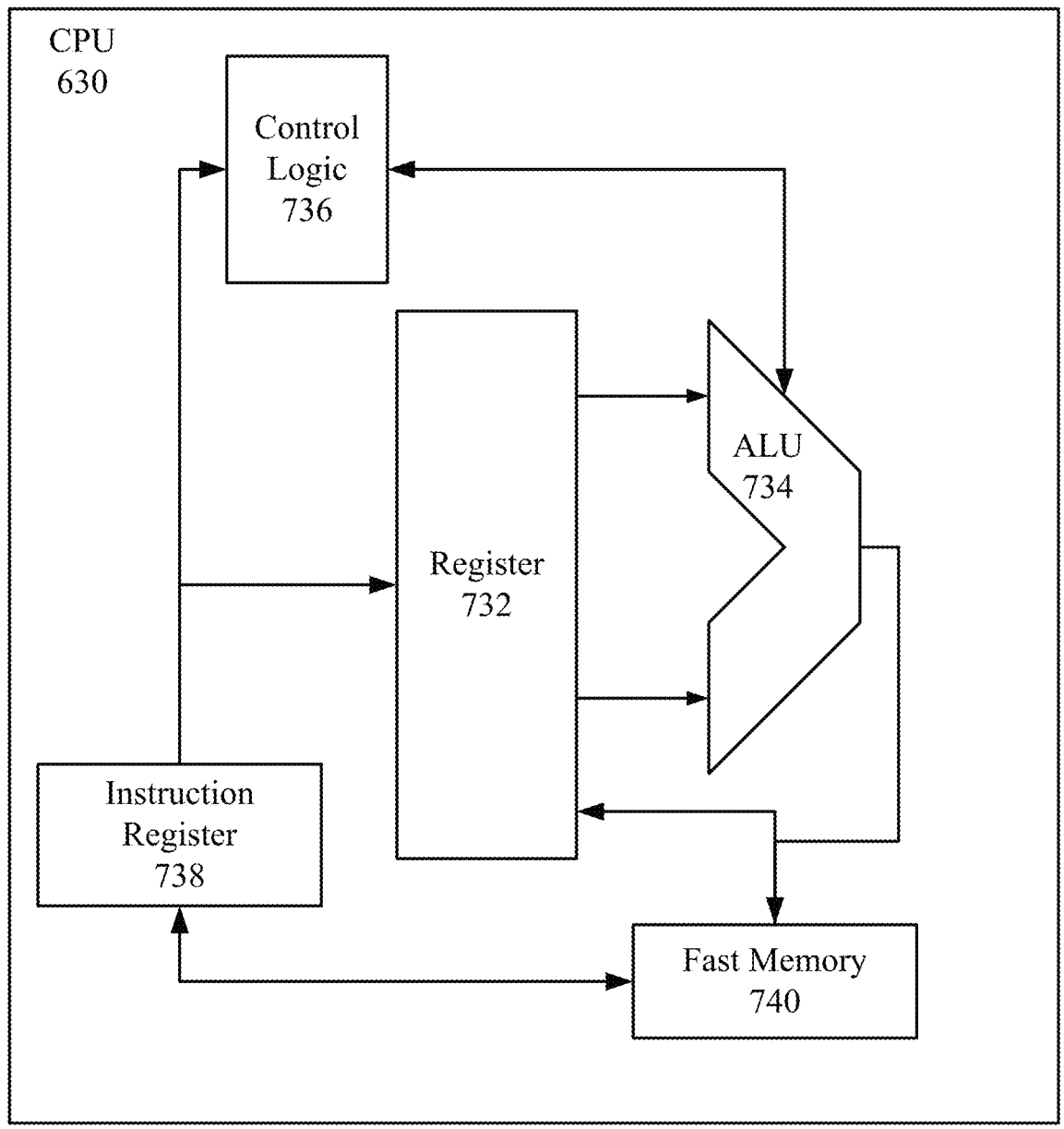
FIG. 7 is an exemplary schematic diagram of a processor used with the computing system, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
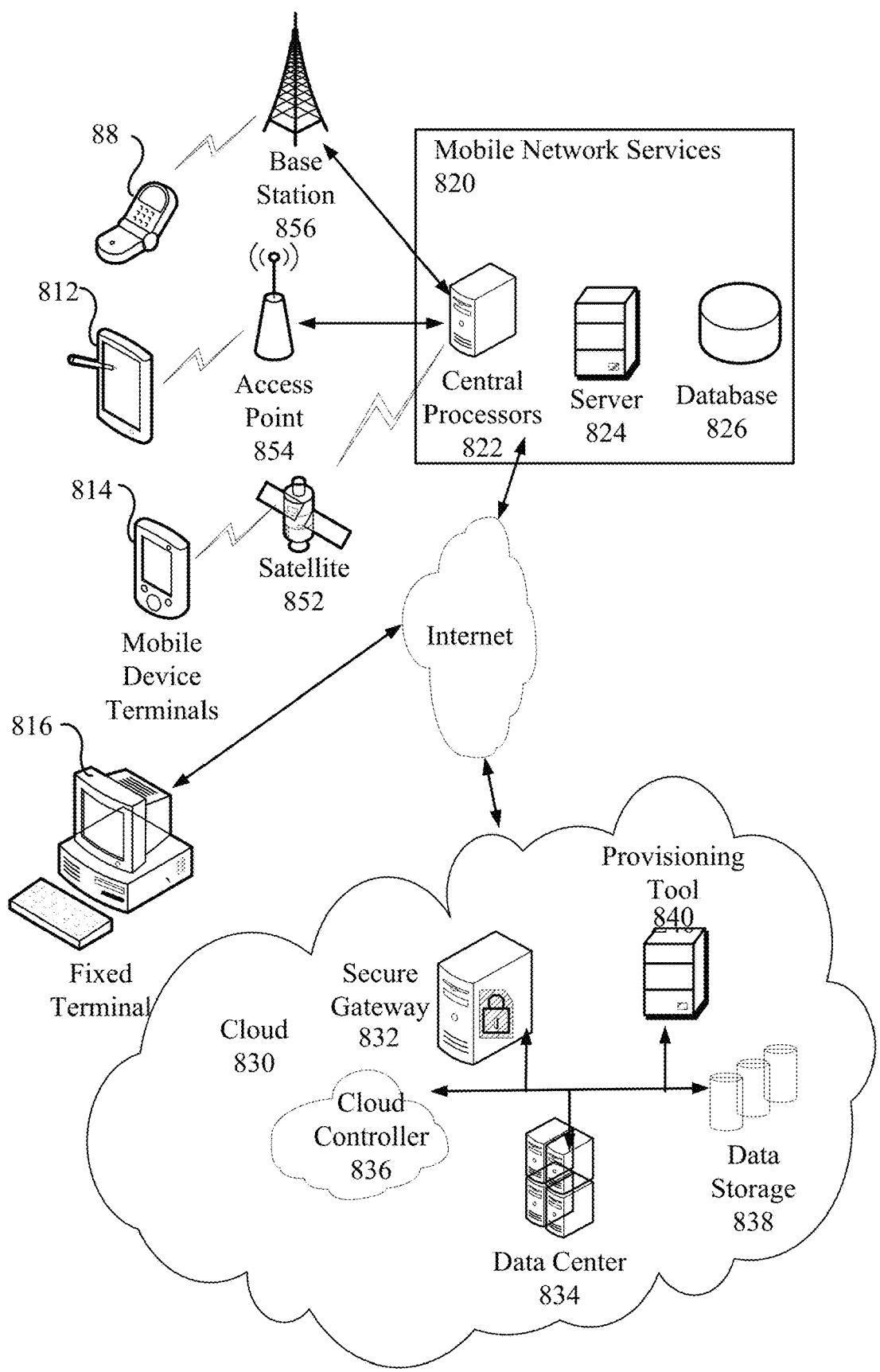
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on units or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for prioritizing the upload of vehicle map data by a central mapping unit, comprising:
   uploading vehicle map data transmitted by a plurality of connected vehicles in ascending order by a priority score, each connected vehicle registered with the central mapping unit, wherein the priority score is determined by calculating a weighted sum of scores based on a distance from a discrepancy, a road type, a discrepancy type, and a hazard type;
   storing the vehicle map data in ascending order by the priority score;
   analyzing the vehicle map data in ascending order by the priority score, wherein the analyzing includes:
      determining differences between the vehicle map data and map data of a central map to detect a discrepancy region;
      determining whether more information is needed to update the central map in the discrepancy region;
      when more information is needed, updating a central priority database to generate an updated priority list and immediately transmitting the updated priority list to those connected vehicles travelling in the discrepancy region;
      when no more information is needed, calculating a confidence score for updating the central map and determining whether the confidence score is greater than a threshold confidence score;
      when the confidence score equals or is greater than a threshold confidence score, updating the central map with the vehicle map data and transmitting an updated central map to the connected vehicles during a scheduled update; and
      when the confidence score is less than the threshold confidence score, storing the vehicle map data,
   wherein a set of discrepancy data having a high number is dropped when a vehicle memory is full and the vehicle memory is needed to store a set of discrepancy data having a lower number.

2. The method of claim 1, further comprising:
   updating the central priority list to give highest priority to data collected from the discrepancy region.

3. The method of claim 1, further comprising:
   updating the central priority list to give highest priority to data collected by at least one external sensor of a connected vehicle travelling in the discrepancy region.

4. The method of claim 1, further comprising:
   updating the central priority database to give highest priority to data collected by at least one external sensor of a connected vehicle travelling in the discrepancy region, the at least one external sensor selected from the group including a camera, a LiDAR sensor, a radar sensor and a far infrared sensor.

5. The method of claim 1, further comprising:
calculating a confidence score based on the priority order and a number of the connected vehicles which upload map data collected in the discrepancy region.

6. The method of claim 5, further comprising:
selecting a confidence score threshold based on traffic volume in the discrepancy region, a type of roadway on which the connected vehicles are travelling and a type of discrepancy.

7. The method of claim 1, further comprising:
transmitting the updated priority list over a cellular communication network.

8. The method of claim 1, further comprising:
transmitting the updated central map to the connected vehicles during a scheduled update over a WiFi communications link.

9. The method of claim 1, further comprising:
transmitting the updated priority list to the connected vehicles over an RF communications band owned by the central mapping unit.

10. The method of claim 1, further comprising:
receiving a request to register a connected vehicle with the central mapping unit;
registering the connected vehicle;
transmitting a portion of the central map to the connected vehicle; and
transmitting a priority list to the connected vehicle.

11. A method for prioritizing the upload of vehicle map data by a connected vehicle registered with a central mapping unit, comprising:
receiving GPS position signals identifying the coordinates of the connected vehicle;
comparing the coordinates to map data of a vehicle map;
detecting differences between the coordinates and the map data;
gathering sensor data by at least one vehicle external sensor;
combining the differences and the sensor data to generate a set of discrepancy data;
matching the set of discrepancy data to a vehicle priority list to determine a priority score, wherein the priority score is determined by calculating a weighted sum of scores based on a distance from a discrepancy, a road type, a discrepancy type, and a hazard type;
when the priority score is a low number, forming a first data packet of the differences, sensor data and priority score and uploading the data packet to the central mapping unit;
when the priority score is not a low number, storing in vehicle memory the set of discrepancy data and the sensor data with the priority score; and
dropping a set of discrepancy data having a high number when the vehicle memory is full and the vehicle memory is needed to store a set of discrepancy data having a lower number.

12. The method of claim 11, further comprising:
identifying that the vehicle has entered an area of high data connectivity;
forming a second data packet from each set of discrepancy data and its priority score stored in the vehicle memory; and
uploading the second data packet to the central mapping unit over a data connection during a scheduled update session.

13. The method of claim 11, further comprising:
identifying nearby connected vehicles;
transmitting requests to the nearby connected vehicles to share external sensor data of the discrepancy region;
receiving the external sensor data from the nearby connected vehicles; and
combining the external sensor data from the nearby connected vehicles with the discrepancy data.

14. A system for prioritizing the upload of connected vehicle map data, comprising:
a central mapping unit including a central communication device, a central server, a central map, a registration database, a priority database and central memory;
a plurality of connected vehicles, each connected vehicle registered with the central mapping unit, each connected vehicle including a vehicle map and a vehicle priority list;
wherein the central server includes a first computing device operatively connected to the central communication device, the central map, the priority database, and the central memory, the first computing device including a computer-readable medium comprising program instructions, executable by first processing circuitry, to cause the first processing circuitry to:
upload vehicle map data transmitted by a plurality of connected vehicles in ascending order by a priority score;
store the vehicle map data in ascending order by the priority score in the central memory;
analyze the vehicle map data in ascending order by the priority score, wherein the analysis includes:
determining differences between the vehicle map data and map data of a central map to detect a discrepancy region;
determining whether more information is needed to update the central map in the discrepancy region;
when more information is needed, updating the priority database to generate an updated priority list and immediately transmitting the updated priority list to those connected vehicles travelling in the discrepancy region:
when no more information is needed, calculating a confidence score for updating the central map and determining whether the confidence score is greater than a threshold confidence score;
when the confidence score equals or is greater than a threshold confidence score, updating the central map with the vehicle map data and transmitting an updated central map to the connected vehicles during a scheduled update;
when the confidence score is less than the threshold confidence score, storing the vehicle map data;
each connected vehicle further including an onboard communications unit, a GPS antenna for receiving GPS position signals identifying the coordinates of the connected vehicle, at least one external sensor operatively configured to collect sensor data of an environment surrounding the connected vehicle;
a second computing device operatively connected to the vehicle map, the vehicle priority list, an onboard communications unit, a vehicle memory, the GPS antenna and the at least one external sensor, the second computing device including a computer-readable medium comprising program instructions, executable by second processing circuitry, to cause the second processing circuitry to:

compare the coordinates to map data of the vehicle map;

detect differences between the coordinates and the map data;

gather sensor data by at least one vehicle external sensor;

combine the differences and the sensor data to generate a set of discrepancy data;

match the set of discrepancy data to a vehicle priority list to determine a priority score, wherein the priority score is determined by calculating a weighted sum of scores based on a distance from a discrepancy, a road type, a discrepancy type, and a hazard type;

when the priority score is a low number, form a first data packet of the differences, sensor data and priority score and upload the data packet to the central mapping unit; and when the priority score is not a low number, store in vehicle memory the set of discrepancy data and the sensor data with the priority score.

15. The system of claim 14, wherein the first processing circuitry is further configured to:

update the central priority database to give highest priority to data collected by at least one external sensor of a connected vehicle travelling in the discrepancy region, the at least one external sensor selected from the group including a camera, a LiDAR sensor, a radar sensor and a far infrared sensor.

16. The system of claim 14, wherein:

the first processing circuitry is further configured to calculate a confidence score based on the priority order and a number of the connected vehicles which upload map data collected in the discrepancy region; and a confidence score threshold is selected based on traffic volume in the discrepancy region, a type of roadway on which the connected vehicles are travelling and a type of discrepancy.

17. The system of claim 14, wherein the first processing circuitry is further configured to:

transmit the updated priority list over a cellular communication network; and transmit the updated central map to the connected vehicles during a scheduled update over a WiFi communications link.

18. The system of claim 14, wherein the second processing circuitry is further configured to drop a set of discrepancy data having a high number when the vehicle memory is full and the vehicle memory is needed to store a set of discrepancy data having a lower number.

19. The system of claim 14, wherein the second processing circuitry is further configured to:

receive the updated priority list;

collect external sensor data while travelling in the discrepancy region;

match the external sensor data to the updated priority list;

assign an updated priority score from the updated priority list; and upload the external sensor data with the updated priority score to the central mapping unit.

* * * * *